United States Patent [19]

Stocker et al.

[11] Patent Number: 4,713,008

[45] Date of Patent: Dec. 15, 1987

[54] METHOD AND MEANS FOR TEACHING A SET OF SOUND SYMBOLS THROUGH THE UNIQUE DEVICE OF PHONETIC PHENOMENA

[76] Inventors: Elizabeth M. Stocker, 3947 Bandini, San Diego, Calif. 92103; Eugene U. Knight, III, P.O. Box 268, Phelan, Calif. 92371

[21] Appl. No.: 905,786

[22] Filed: Sep. 9, 1986

[51] Int. Cl.$^4$ ............................................. G09B 19/00
[52] U.S. Cl. .................................... 434/167; 434/156; 283/46
[58] Field of Search ............... 434/156, 157, 160, 167, 434/170–172, 185, 307, 311–313; 283/1 A, 45, 46; 400/486

[56] References Cited

U.S. PATENT DOCUMENTS

| | | | |
|---|---|---|---|
| 2,361,154 | 10/1944 | Schoolfield | 434/167 |
| 2,824,389 | 2/1958 | Orebaugh | 434/167 |
| 3,426,451 | 2/1969 | Hoffman | 434/178 |
| 3,571,951 | 3/1971 | Siegel | 434/178 |
| 3,715,812 | 2/1973 | Novak | 434/170 |
| 4,007,548 | 2/1977 | Cytanovich | 434/178 |
| 4,115,932 | 9/1978 | Charlesworth | 434/167 |
| 4,193,212 | 3/1980 | Al-Kufaishi | 434/178 |
| 4,262,431 | 4/1981 | Darnell | 434/178 |
| 4,398,891 | 8/1983 | King | 434/178 |
| 4,443,199 | 4/1984 | Sakai | 434/170 |
| 4,650,423 | 3/1987 | Sprague et al. | 434/156 |

FOREIGN PATENT DOCUMENTS

| | | | |
|---|---|---|---|
| 86337 | 8/1955 | Norway | 434/167 |
| 1254794 | 11/1971 | United Kingdom | 434/167 |

OTHER PUBLICATIONS

Fry, Edward, Ph.D., "The Diacritical Marking System", in The Journal of Typographic Research, Jan. 1967.

Martin, John Henry, *Writing to Read Teacher's Manual*, 1984, pp. I-3 to I-6.

Anderson, Richard et al., *Becoming a Nation of Readers: The Report of the Commission on Reading*, 1984, p. 40.

*Primary Examiner*—John E. Murtagh
*Assistant Examiner*—Andrew Joseph Rudy

[57] ABSTRACT

A method of teaching a set of indicia as representations of language sounds by associating each symbol with an event, or phonetic phenomenon, which produces the sound. In this manner, the sounds are presented in isolation rather than as an element of the oral form of a word. In addition to the combination of sound, event and symbol, the method uses a distinct gesture with each sound to ensure the proper articulation of that sound and to allow the student to become an active participant in the event. The method allows the student to acquire a set of symbols to represent language sounds without requiring the separation of an individual sound from a word. Instead, soniferous events are used to allow the student to make a meaningful connection between each symbol and the sound it represents.

14 Claims, 43 Drawing Figures

BOUNCING buh — Bouncing a ball

DRUMMING duh — Drumming

MOTORBOAT juh — A motor vibrating

GUITAR guh — Plucking a guitar

POPPING pih — A kernel of popcorn popping

TICKING tih — A pendulum ticking

STRIKING chih — Striking a match

POUNDING kih  Pounding in a nail

FLY vvv  Swatting a fly

FAN thhe  Fan blade vibrating

ELECTRIC zzz  An electric arc

SAW zhh  Using an electric saw

SANDING fff  Sanding with the palms

TEAKETTLE thh  Holding a teakettle

AIR ESCAPING

SSS  Forming the symbol

BE QUIET shh  Be quiet

YUMMY mmm  Rubbing the stomach

SEE-SAW nnn  A rocking see-saw

TUNING FORK ngg  A vibrating tuning fork

TIRED hih  A sigh of exhaustion

DIAL TONE lll  Listening to the dial tone

BARKING ruh   Barking behind the bone

ROOSTER rrr   A rooster crowing

SQUEEKY

ē   Forming a squeeking hinge

ICKY ih   Forming the broken egg

SPEAK LOUDER eh   Speak louder

NO-NO

ă   As if scolding

THINKING uh   As if in thought

LOVE oo    A cooing sound

SURPRISED o    Acting surprised

LIFTING oo    Showing exertion

CROW aw    Sounding like a crow

DOCTOR ah    Open and say ah

HAPPY a    Arms up in joy

HURTING ow    As in pain

FALLING

ī    As if falling

DRIPPING oy    A dripping spout

ROPING wuh    Swinging a lariat

BOOMERANG yub    Throwing a boomerang

METHOD AND MEANS FOR TEACHING A SET OF SOUND SYMBOLS THROUGH THE UNIQUE DEVICE OF PHONETIC PHENOMENA

BACKGROUND OF THE INVENTION

1. Field of the invention

The invention relates generally to instruction in the fields of reading, phonics, and spelling. More particularly, the invention relates to the teaching of a set of sound symbols as an aid to instruction in these fields.

2. Prior art

Written English is an alphabetic language. Every distinct language sound, or phoneme, in the oral form of a word has an identifiable connection with a letter or letter group in its written form. This is the alphabetic principle.

For the beginning reader to acquire the skill of decoding, of puzzling out new words in written English, he must have a working understanding of the alphabetic principle. This entails not only learning how the sounds of the language are represented graphically, but also learning now these sounds exists in oral language. This is not a trivial skill. In *Becoming a Nation of Readers*, the report of the Commission on Reading, 1985, on page 40 it is stated that. "There is evidence that many young children cannot extract an individual sound from hearing it within a word."

Typically, the pre-literate child has no concept of "phonemic segmentation"—the skill of recognizing individual language sounds within the oral form of a word. He does not know that oral language consists of a sequence of sounds, or that these sounds exist individually.

If the student is to realize that these sounds exist, then he must be given a way of referring to them. In classic phonics this is done by attaching each sound to both a graphic symbol, to represent the sound, and to a picture word which presents the sound as a part of his oral language. The picture word is then connected graphically with the symbol. For example, the word "boot" might be used to provide an example of the sound associated with the letter "b". The student is encouraged to hear the sound at the beginning of the word, and to see a drawing of a boot as being similar to the letter form of "b".

It is not a simple task for the child to associate the graphic form of a letter with the sound that it represents, unless a meaningful connection can be made between the two. The picture word provides the student with this meaningful connection, but for the student to understand it, he must already have acquired the skill of phonemic segmentation. Thus, this approach requires of the student a certain proficiency with language sounds if he is to see a meaningful connection to the symbols which represent them.

It is difficult for the literate adult to understand the trouble that a child can have in identifying the first sound in a word. The adult already has an adequate means for representing sound. With this means, it seems obvious that the first sound in "boot" is the sound associated with "b." There are situations, though, where these tools can't be applied. Each alphabet letter name, for example, contains a vowel sound, but it is not always an easy task to separate this sound or to identify it. For example it is less than obvious that the vowel sound that exists at the beginning of the letter name of "r" is the same vowel sound that is found in the middle of the word "not." Naturally, isolating a sound is a much more difficult task for the pre-literate child than it is for the adult who has a vast amount of experience with phonemic segmentation.

There are programs which teach sound symbols without using the skill of phonemic segmentation, but this is only achieved by using symbols which have no connection at all with the sounds they represent. It may be difficult for the child to associate the letter form of "b" with a picture of a boot, but this must be easy compared to associating a comma with the schwa sound, as one approach listed below does.

There is no existing method which teaches the pre-literate student a meaningful association of graphic symbols to the sounds of a language without requiring the skill of phonemic segmentation. Prior art in methods of instruction in reading which involve the teaching of a set of sound symbols falls into two categories:

Firstly, methods of instruction in the teaching of sound symbols which require the skill of phonemic segmentation:

U.S. Pat. No. 4,007,548 discloses a system similar to classic phonics. In this case, the pictures are not used to associate a sound with a given alphabet letter, but are used to indicate sound directly. Thus a simple drawing of an apple is used to represent the short "a" sound.

U.S. Pat. No. 4,115,932 discloses a method of associating vowel sounds with colors to aid in recognizing the sound that is represented by a letter. In this method, the sound usually represented as "oi" is denoted by the color turquoise, since the name of the color contains the sound.

In 1982 IBM introduced the "Writing to Read" system, developed by John Henry Martin. This system teaches the student a set of letters and digraphs to represent the majority of sounds in English. Each letter or digraph is associated with a picture word to provide a connection to the sound.

U.S. Pat. No. 4,398,891 discloses a method of teaching the association of alphabet letters with the sounds they commonly represent by conceptually connecting each letter with a part of the body. The method uses phrases such as "i is for my intestines" along with diagrams of the body to make a meaningful connection.

Secondly, methods in which arbitrary associations must be made in order to understand the graphic representation of sound:

In 1964, Edward Fry introduced the Diacritical Marking System, which uses standard typewriter symbols to indicate the pronunciation of letters within a word. The student is taught that an "a" with a comma above it represents the schwa sound, and an "a" with a caret above it represents the short "o" sound.

U.S. Pat. No. 3,426,451 discloses a system in which changes in the shading of a type font indicate the pronunciation given to a letter. The student is taught that a light "a" represents the short sound of "a", a bold "a" represents the long sound, and an "a" formed of dots is silent.

U.S. Pat. No. 3,571,951 discloses a system of using color and texture to indicate sound. The student is taught that the long "e" sound is associated with a letter form that is green with a "prickled" texture, and the long "a" sound is indicated by a letter form that is yellow with a "silky" texture.

U.S. Pat. No. 3,715,812 discloses a method of using color to represent sound. The system encompasses a total of eighty color-letter form combinations, and uses color to associate the pronunciation of one letter with another, rather than directly to sound. The student is taught that a blue "f" represents the sound usually associated with "f", and a green "f" represents the sound usually associated with "v".

U.S. Pat. No. 4,193,212 discloses a method of using diacritical marks to indicate the sound associated with a letter which is similar to that used by Fry. In this case, marks not available on the typewriter are used.

U.S. Pat. No. 4,262,431 discloses a method of using color to indicate the character of consonant and vowel sounds. The coloring of a letter indicates whether a consonant is voiced or unvoiced, hard or soft, and whether a vowel is short or long.

U.S. Pat. No. 4,443,199 discloses a system in which color represents sound directly. The student is taught that a color represented in the patent as "bright dark yellow" is associated with the long sound of "i", and that dark blue is associated with the long sound of "e".

SUMMARY AND OBJECTS OF THE INVENTION

The invention consists of a method of teaching a set of indicia to represent the sounds of language, without using the skill of phonemic segmentation. The method establishes a meaningful connection between each indicium and the sound that it represents by associating both indicium and sound with a phonetic phenomenon—an event which produces the sound. Each indicium is presented as a simple, graphic representation of essential components of the event. Placing the sound in the context of a soniferous event allows the student to come to know the sound in isolation, rather than in the context of oral language.

It is an object of the invention to provide reading programs with a new tool for instruction by providing a set of sound symbols which can be used to explicitly show the connection between written and oral language. It is common in reading instruction today to gradually teach the student the skills that are required for independent reading in the course of teaching a beginning reading vocabulary. Initially, for example, only the beginning sound and letter of each word is taught. After the student has mastered the skill of connecting beginning sounds to letters, then other skills are sequentially introduced until, finally, the student has the skills necessary to independently increase his reading vocabulary. The sound representation of simple consonants like "p", consonant blends like "str", consonant digraphs like "sh", short vowels, long vowels, the silent "e", vowel digraphs like "ai", diphthongs like "ou", etc. is introduced in a systematic way as reading instruction progresses. The majority of skills used in independent decoding involves a knowledge of the representation of sound in written language. The sound symbols taught by the present invention provide the simplest and most meaningful means for indicating this representation.

Furthermore, it is an object of the present invention to provide a tool to aid in the organization and memorization of the spelling patterns that are used in written language. A separate set of indicia to represent sound allows the representation of sound in written language to be explained without confusion.

It is also an object of the invention to allow the student to acquire the use of this symbol system without need of the skill of phonemic segmentation. Each symbol-sound association can be understood without any knowledge of the structure of oral language.

It is an object of the present invention to allow a set of indicia to be learned by the beginning reader with less time and effort than is associated with learning the letters of the alphabet. The sound symbols have been taught to two, three, four, and five year olds, second and third graders, and adults. The case with which the symbols can be acquired, particularly by preschool age children, is remarkable. Whereas preschool age children can be exposed to instruction in alphabet letter recognition for more than a year and still not learn the letter names, each of the thirty-nine sound symbols is mastered in just minutes.

It is another particular object of the invention to provide an aid to instruction in the representation of vowel sounds in English. This is the most difficult area of phonics, and one of the most important applications of the symbol system taught by the invention. In July 1986, nineteen second and third grade children were given a total of six hours of group instruction in this area, as part of a summer school program. Testing of the group both before and after the instruction indicated improvement in this area in eighteen out of nineteen of the students, in many cases a dramatic improvement.

It is an object of the invention to give the student who is learning English as a second language a set of sound symbols which are not based on English words. For the sounds that do not exist in the student's native language, the invention provides an easy way to acquire an association with these new sounds.

Other objects and advantages of the present invention will become apparent from a study of the following specification and the accompanying drawings.

BRIEF DESCRIPTION OF THE DRAWINGS

FIG. 48 is a section of a chart used for instruction in spelling.

DESCRIPTION OF THE ILLUSTRATED EMBODIMENT

Figure 1:
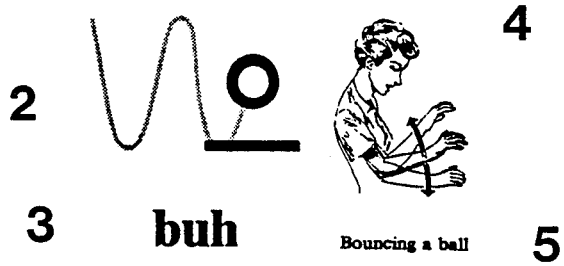
FIGS. 1 through 39 present the sounds of the illustrated embodiment.

The simplest implementation of the invention comprises a method of associating each of a set of indicia with one distinct language sound. The method uses a set of soniferous events in which the language sounds occur individually, in isolation, to aid in forming a meaningful connection between the indicium and the sound that it represents. These events are referred to as the phonetic phenomena. The events are selected to allow the student to make a reasoned connection between the indicia and their respective sounds.

The environment is full of events that produce sound. A plucked string, a squeaky hinge, the beating of a fly's wings, a board being sanded, water dripping, all of these represent sounds of different character. For many sounds that occur in the environment, it is possible to find language sounds which have a similar character. Each phonetic phenomenon represents the believable connection of a language sound to an event like one of these.

In a simple embodiment of the invention, the association of indicium with sound can be taught to the student using just the following steps:

Presentation of a depiction of the phonetic phenomenon:

This depiction is presented in a manner that the student may understand the soniferous event that produces the sound.

Presentation of the language sound:

The sound is presented to the student in the context of the event. The particular association of sound and event is made on the basis of similar sound character so that the association is believable.

Presentation of the indicium:

The indicium which is to be associated with the language sound is conveyed to the student, and he is made to understand that the indicium represents essential components of the event.

The following example shows how a simple indicium can be connected with a language sound through a phonetic phenomenon. The indicium in this example is not a part of the illustrated embodiment of the invention, but is included to demonstrate one of the invention's simpler applications, and to demonstrate that there are many soniferous events which could be used to represent each sound.

To give to the student an indicium to represent the sound usually spelled "ch," a description of the event that produces the sound is given by the teacher, then the sound is modeled by her;

"When a steam engine pulls a train away from the train station, it makes this sound, 'ch - ch - ch'."

Then the student is shown an indicium which might consist of three circles in a horizontal arrangement. He is told:

"This represents the wheels on the steam engine."

Through instruction using this method, the student comes to associated the indicium of the three circles in a horizontal arrangement with the sound "ch," and this indicium can be used as an aid to teaching the association of letter patterns with the sound.

Obviously, the steps indicated above can be carried out in many different particular ways. The depiction of the phonetic phenomenon may be presented graphically, as a diagram of the event, or, if the student is literate, as a written description of it. The depiction can also be presented in the form of a description given by the teacher, an audio or video reproduction means, or through the audio or video output of a computer system. The step of conveying the indicium to the student may take many forms as well. A flashcard, projection screen, chart, video monitor, book, chalkboard, any of these could be used to convey the indicium to the student.

Presentation of the sounds in the context of phonetic phenomena, rather than words of oral language allows the student to acquire symbols to represent sounds with a minimum of conceptual development. The student is given a way of referring to sounds before he must learn to apply them to language.

In the illustrated embodiment of the invention, the symbols that are taught using the method herein described represent the thirty-nine sounds that comprise the English language. In addition, several steps are used which are not included in the simple embodiment of the invention just described.

As an aid to making a meaningful connection between indicium and sound, the student is provided with a number of perspectives from which to view each sound. These become attributes of the sound and they are all associated with the phonetic phenomenon. Many of these attributes are shown in FIG. 1, and this figure will be referred to in the following discussion. They consist of:

The indicium
The Phonetic Phenomenon Diagram
The perceived form of the sound
The articulation of the sound
The kinetic symbol
The name of the sound The Indicia:

Each graphic sound symbol is a simple representation of an essential component of the phonetic phenomenon. This representation is made explicit for the student through diagrams of the phonetic phenomena which show each symbol prominently.

Phonetic Phenomenon Diagrams:

The symbol system of the illustrated embodiment has been designed so that each sound is made to occur in its isolated form in a situation that the beginning reader can understand. This provides the student with a meaningful connection to the sound and a way to refer to it.

Each phonetic phenomenon is graphically conveyed to the student in the form of a Phonetic Phenomenon Diagram which shows the graphic symbol as a part of it. As a part of the presentation of the Phonetic Phenomenon Diagram, a verbal description of the scene is given to show the connection between the indicium and the event that produces the sound.

For example, the Phonetic Phenomenon Diagram shown as 2 in FIG. 1 shows a ball bouncing on the floor. The indicium which represents the sound is shown as bold, and the lighter part of the illustration is used to put the indicium into a meaningful graphic context.

Figure 41:
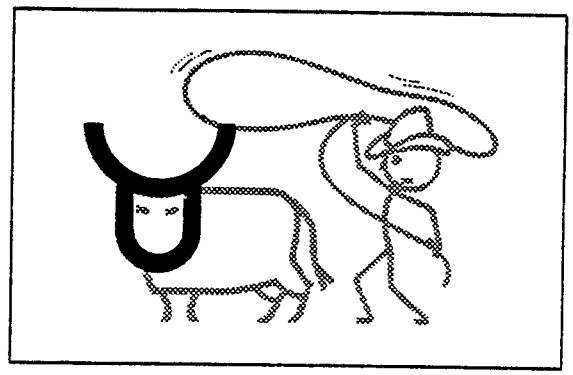
FIG. 41 shows a flashcard with a Phonetic Phenomenon Diagram applied to it.

In the illustrated embodiment, the Phonetic Phenomenon Diagrams are presented to the student in the form shown in FIG. 41. This figure shows the Phonetic Phenomenon Diagram applied to a suitable means for carrying information, in this case a flashboard.

The Kinetic Symbols:

Associated with each phonetic phenomenon is a kinetic symbol. The kinetic symbols are motions or gestures which are performed synchronously with the articulation of the sound.

Children enjoy making sounds, and connecting those sounds with actions. The kinetic symbols take advantage of this natural drive and allow the child to become a part of the phonetic phenomenon.

Most children who are beginning to read have gained the majority of their knowledge through direct experience. The kinetic symbol allows the phonetic phenomenon to become an experience that the child has had, rather than a story that has been told to him. This gives the phonetic phenomenon a degree of reality for the child that it would not otherwise have.

There is another important trait of the kinetic symbol which involves the similarity in the way in which a gesture and the articulation of the sound are perceived by the student.

The articulation of the sound provides kinesthetic feedback to the student, apart from the auditory feedback. Since the execution of the kinetic symbol also has kinesthetic aspects, the simultaneous production of sound and gesture becomes a single kinesthetic experience for the student. This makes the connection between the gesture and the sound a reliable one.

The kinetic symbols are modeled for the student by the teacher. They are presented to the teacher in the form of illustrations such as 4 shown in FIG. 1. In this example, it consists of a motion similar to bouncing a ball. This motion is executed as the sound of the ball bouncing on the floor is repeated, "buh - buh - buh."

A description of the thirty-nine sounds of the illustrated embodiment follows, with a brief description of the meaning of the symbol, phonetic phenomenon diagram, and kinetic symbol for each. Each figure presents not only the Phonetic Phenomenon Diagram and the kinetic symbol, as described above, but also other information pertinent to the sound. Using FIG. 1, 1 shows the name of the sound, this is "The Bouncing Sound." 3 shows simple, spelled form of the sound, "buh." 5 is a phrase describing the meaning of the kinetic symbol.

Production of the Sounds in Isolation

Anyone familiar with written English knows that the words "bat" and "boy" begin with the same sound, but it is impossible to produce this sound in isolation without adding a vowel sound to it. The best version of the sound that can be given in isolation is "buh", using the schwa sound following the "b" sound. Of all the sounds that comprise oral English, only six have this difficulty. The true vowel sounds, as well as many of the consonant sounds cause no trouble.

The sounds associated with the spellings "b", "d", "j", "g", "w", and "y", cannot be produced in isolation, and they are rendered as: "buh", "duh", "juh", "guh", "wuh", and "yuh" respectively.

It is tempting to treat the sounds represented by "p," "t," "ch," "k," and "h" in the same way, but these sounds do not require the addition of a vowel sound. These five sounds should be completely unvoiced, and to indicate this they are represented by the spellings "pih", "tih", "chih", "kih", and "hih" respectively. The "ih" is appended to the sound spelling only to differentiate the representation of the sound from the letter name, and is not to be pronounced.

FIG. 1: The symbol represents a ball bouncing on the floor, and the kinetic symbol reflects this. The sound is "buh," the first sound in "back". The sound is repeated several times, "buh - buh - buh."

Figure 2:
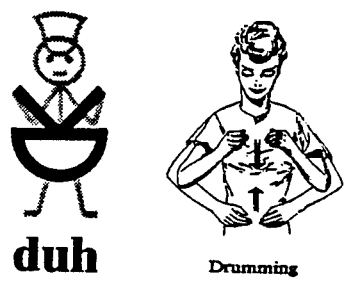

FIG. 2: This is the first sound in "dog", "duh." The kinetic symbol relates to using a pair of drumsticks, and the symbol represents a drum. The sound is repeated as "duh - duh - duh."

Figure 3:
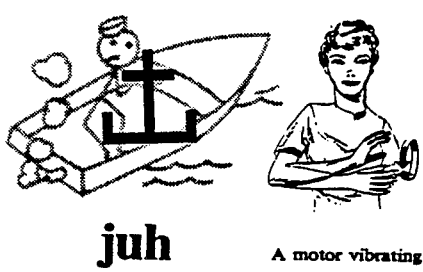

FIG. 3: The symbol represents the anchor of the motorboat, which is being held by the figure in the Phonetic Phenomenon Diagram. The kinetic symbol reflects the vibrating motion of the motor which is producing the sound. The sound is "juh," the first sound in "jar." It is repeated.

Figure 4:
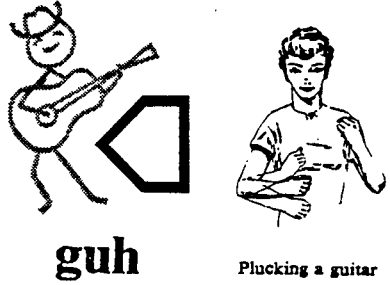

FIG. 4: This is "guh," as in "gost". The sound is produced by the plucked string. The symbol represents a guitar pick, which is being used by the figure in the Phonetic Phenomenon Diagram. The kinetic symbol consists of the motion of plucking a string on a guitar.

Figure 5:
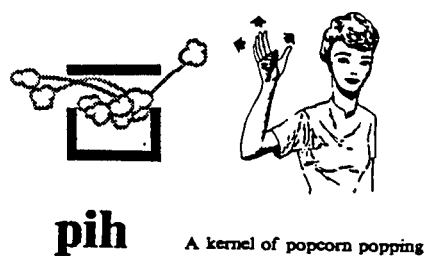

FIG. 5: This is "pih," the sound associated with "p", and the first sound in "pig". The sound is produced by a kernel of popcorn popping. The Phonetic Phenomenon Diagram shows the lid of a container pushed up by the popping corn. The kinetic symbol represents a single kernel popping.

Figure 6:
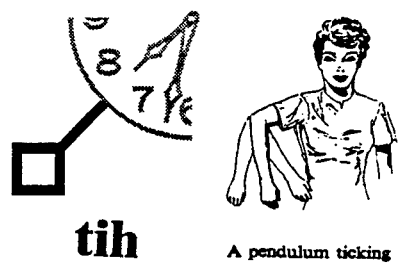

FIG. 6: The symbol represents a ticking pendulum, and the swinging arm in the kinetic symbol reflects it. The sound is "tih," as in "town". Repeated.

Figure 7:
Figure 8:
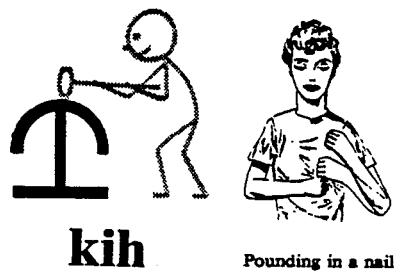

FIG. 7: The Phonetic Phenomenon Diagram shows a striking match. In the kinetic symbol, the figure's left index finger represents the match being struck against the corner of the matchbox. The sound is "ch," the first sound in "chair". Phenomenon Diagram shows the figure pounding on an oversized nail. The kinetic symbol also reflects a pounding motion.

Figure 9:
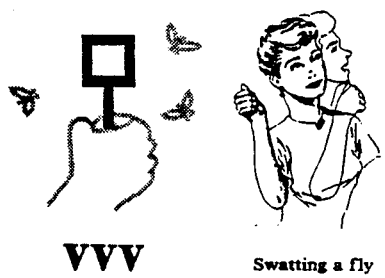

FIG. 9: The symbol represents a fly swatter, and the kinetic symbol is formed with a movement similar to watching and finally swatting a fly. This is the first sound in "vine", "vvv."

Figure 10:
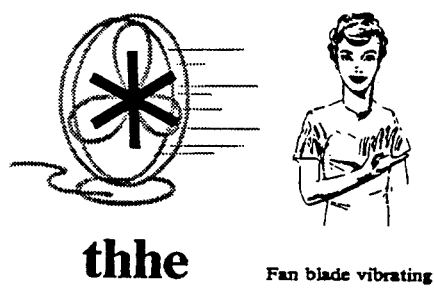

FIG. 10: The Phonetic Phenomenon Diagram shows an electric fan, and the kinetic symbol relates to the vibration of the fan blades. This sound is the voiced "th," as in "they".

Figure 11:

FIG. 11: This is the first sound in "zoo", which is "zzz". The Phonetic Phenomenon Diagram shows an electric arc between the two arms of the symbol. The kinetic symbol reproduces this part of the symbol.

Figure 12:
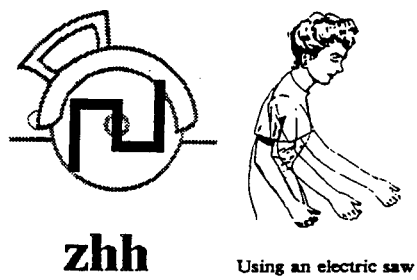

FIG. 12: The sound is "zh," the sound represented by "s" in the word "measure". The symbol represents the blade of a circular saw. The motion of using such a saw forms the kinetic symbol.

Figure 13:

FIG. 13: The symbol represents two blocks of wood, which are being moved back and forth with a sanding motion. The palms of the hands in the kinetic symbol duplicate this motion. The sound is "fff," the first sound in "farm". Repeated.

Figure 14:
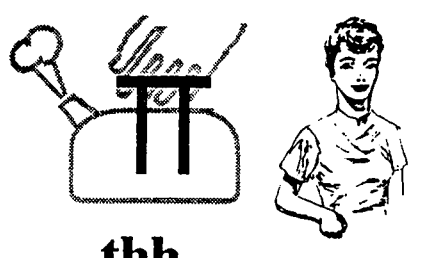

FIG. 14: The Phonetic Phenomenon Diagram shows a teakettle with steam pouring from the spout. The boiling water in the teakettle produces the sound. The symbol represents the handle of the teakettle, and the kinetic symbol consists of holding this handle. This is the first sound in "throw", the unvoiced "th" sound.

Figure 15:
Figure 15:

FIG. 15: The sound is "sss," as in "sit". The Phonetic Phenomenon Diagram shows air escaping out of a hole in the top of a container. The hands form the container in the kinetic symbol.

Figure 16:
Figure 16:

FIG. 16: This is the first sound in "show", "sh." The Phonetic Phenomenon Diagram shows a finger over the mouth as if telling someone to be quiet, and the kinetio symbol is similar.

Figure 17:
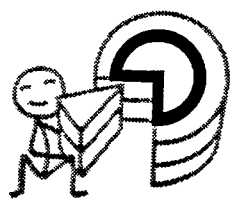
Figure 17:

FIG. 17: The Phonetic Phenomenon Diagram shows a cake with a piece removed. The motion of rubbing the stomach forms the kinetic symbol. The sound is "mmm," the first sound in "man".

Figure 18:
Figure 18:

FIG. 18: The Phonetic Phenomenon Diagram shows two children sitting on a see-saw, and the kinetic symbol represents the rocking motion of the see-saw. This is "nnn," the first sound in "nest". In the dramatic form, the sound is given a sing-song intonation as it is repeated.

Figure 19:
Figure 19:

FIG. 19: The symbol represents a tuning fork, and the kinetic symbol forms the tuning fork with the hand. This is the sound represented by "ng," the last sound in "sing".

Figure 20:
Figure 20:

FIG. 20: The sound is "hih," as in "hat". The symbol represents a figure with its arms hanging down, as if tired. To form the kinetic symbol, the arms are dropped and the head is brought forward. The sound resembles a breathy sigh when given in isolation.

Figure 21:
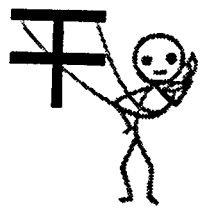
Figure 21:

FIG. 21: The symbol represents a telephone pole, and the figure in the Phonetic Phenomenon Diagram is listening to the dial tone on the telephone it is holding. The kinetic symbol consists of picking up an imaginary telephone and holding it to the ear. This is the last sound in "doll", "lll."

Figure 22:
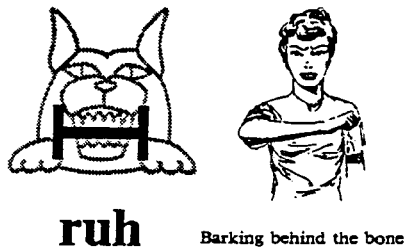

FIG. 22: The sound is "ruh," as in "rain". The Phonetic Phenomenon Diagram shows the symbol as a bone, sitting in front of the barking dog, and in the kinetic symbol, the arm that is held up also represents the bone.

Figure 23:
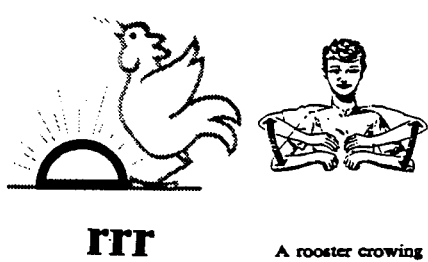

FIG. 23: This is "rrr," the first sound in "earn". The symbol represents the rising sun, and the kinetic symbol reflects the movement of the crowing rooster's wings. The sound is repeated dramatically "rrr - rrr - rrr - rrr."

Figure 24:
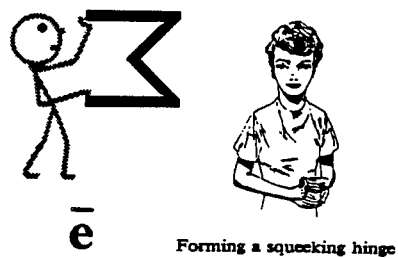

FIG. 24: The figure in the Phonetic Phenomenon Diagram is spreading the arms of the symbol apart, and the sound is produced by a squeaky hinge at one of the corners of the symbol. The kinetic symbol also forms the squeaking hinge. The sound is long "e" as in "east", and is produced in a sing-song voice as it is repeated. The finger tips move away from the body and then back toward the body and then away from the body again.

Figure 25:
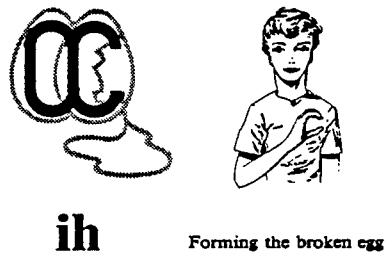

FIG. 25: This is the first sound in "inch", short "i." The symbol is a stylized representation of two eggs, one of which is broken. The kinetic symbol represents the broken egg. The sound is said dramatically, showing revulsion at the mess left by the broken egg.

Figure 26:
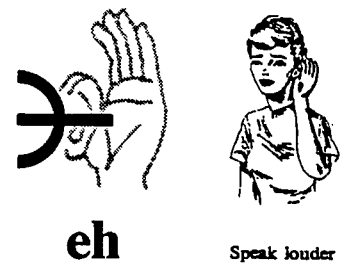

FIG. 26: The Phonetic Phenomenon Diagram shows the symbol superimposed on a hand cupped behind an ear. The kinetic symbol is similar. This is short "e," the first sound in "end". The sound is produced dramatically as a question, "eh?"

Figure 27:
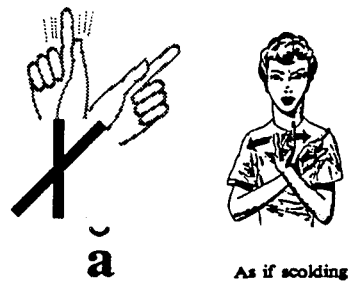

FIG. 27: This is short "a" as in "ant". The forearms are crossed and the finger wags accusingly in the kinetic symbol, as the sound is repeated in a scolding manner. The symbol reflects the arrangement of the arms in the kinetic symbol.

Figure 28:
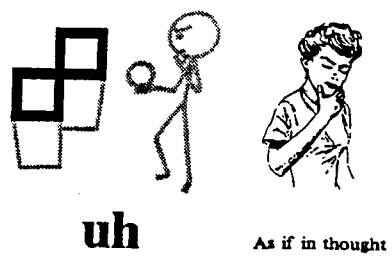

FIG. 28: The symbol represents two containers, and the figure in the Phoenetic Phenomenon Diagram wonders into which container he should throw the ball. The kinetic symbol reflects an attitude of thought. The sound is short "u" as in "up"

Figure 29:
Figure 29:

FIG. 29: The last sound in "sue", this is long "oo." The Phonetic Phenomenon Diagram shows the symbol superimposed on two lovebirds, and the kinetic symbol consists of forming the symbol, a heart, with the hands. The sound is produced dramatically as a soft, cooing sound.

Figure 30:
Figure 30:

FIG. 30: Both the Phonetic Phenomenon Diagram and the kinetic symbol relate to opening a box and looking inside it. This is the first sound in "oak", which is long "o." It is rendered with drama as "Oh!"

Figure 31:
Figure 31:

FIG. 31: The symbol represents a heavy object with a handle on top, and the kinetic symbol reflects lifting such an object. The sound is short "oo," the vowel sound in "bush".

Figure 32:
Figure 32:

FIG. 32: The Phonetic Phenomenon Diagram shows a bird in flight, and the movement of the hands in the kinetic symbol represents the flapping of wings. This is short "o," the last sound in "saw".

Figure 33:
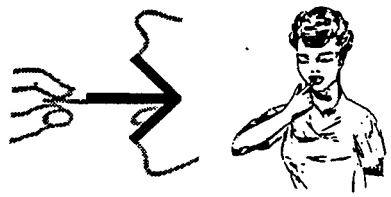

FIG. 33: The symbol represents a tongue depressor and an open mouth, which is shown in the Phonetic Phenomenon Diagram. In the kinetic symbol, the index finger represents the tongue depressor. The sound is usually represented by an "a" with an umlaut over it. It is the vowel sound in "dot". The Phonetic Phenomenon is taken from the phrase that we associate with the family doctor, "Open wide and say, 'ah.'"

Figure 34:
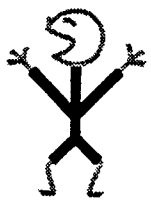
Figure 34:

FIG. 34: The symbol suggests a figure with its arms raised in joy, and the kinetic symbol duplicates this. This is the long "a" sound, the first sound in the word "aim".

Figure 35:
Figure 35:

FIG. 35: The sound is "ow," as in "out". The Phonetic Phenomenon Diagram shows the hand striking a hard object, and the symbol represents this schematically.

Figure 36:
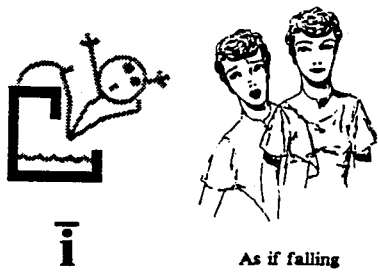

FIG. 36: This is long "i," the first sound in "ice". The Phonetic Phenomenon Diagram shows the figure falling into a pool, and the sound is produced as a long, drawn-out cry, falling in pitch. In the kinetic symbol, the body leans to the side, with the head tilting in the same direction, as if falling in that direction.

Figure 37:

FIG. 37: The symbol represent a water drop, and the Phonetic Phenomenon Diagram shows it falling into a pool of water. The kinetic symbol consists of the hand opening as it drops, as if releasing such a drop. The sound is "oy," as in "oil". The sound is repeated "oy - oy - oy."

Figure 38:
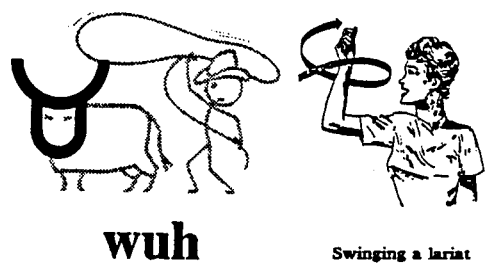

FIG. 38: The Phonetic Phenomenon Diagram shows a cowboy roping a cow, and the kinetic symbol relates to swinging the rope overhead. This is "wuh," the first sound in "wet". The sound is repeated "wuh - wuh - wuh."

Figure 39:

FIG. 39: The symbol represents a boomerang, which has been thrown by the figure in the Phonetic Phenomenon Diagram. The kinetic symbol is the gesture of throwing, and the sound is produced by the boomerang as it rotates through the air. The sound is "yuh," as in "yard".

Method for Teaching the Indicia

In the illustrated embodiment, the various aspects of the sounds are presented to the student through the following steps:

Presentation of the Phonetic Phenomenon Diagram:

The teacher presents the Phonetic Phenomenon Diagram to the class. The diagram may be applied to a flashcard, projected on a screen, appear on a video monitor or in books, or any other means for conveying the information to the class. Any of these is considered to be a suitable means for carrying information.

Depiction of the Phonetic Phenomenon:

The teacher announces the name of the sound, and describes the event which is depicted. This description includes pointing out the proximate cause of the pertinent sound.

Articulation of the sound and Execution of the kinetic symbol:

The teacher directs the class to imitate her sound and movement, then she articulates the pertinent sound and simultaneously executes the kinetic symbol for that sound.

Using the sound shown in FIG. 38 as an example, the teacher displays the flashcard with the Phonetic Phenomenon Diagram for the "wuh" sound, FIG. 41, and describes the connection between the sound and the event which is depicted. For example, "This is The Roping Sound. When the cowboy swings the rope over his head, it makes this sound . . . "

Before the teacher produces the sound, and executes the kinetic symbol for the sound, she directs the class to imitate the sound and movement that she will model, "Everyone, do it with me, 'wuh - wuh - wuh.'"

Figure 40:
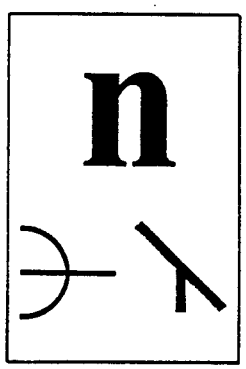
FIG. 40 shows sound symbols used to express the name of an alphabet letter.

Applications:

After some fraction of the symbol-sound associations has been learned by the student, it is possible to use the sound symbols as an aid in learning alphabet letter names, reading and spelling. FIG. 40 shows one application of the symbols, for use with the beginning reader. On the flashcard the two sounds that form the letter name of "n" are indicated, the short "e" sound and the sound associated with "n." One of the sounds is emphasized, to show that this is the sound associated with the letter when it appears in a word.

Figure 42:
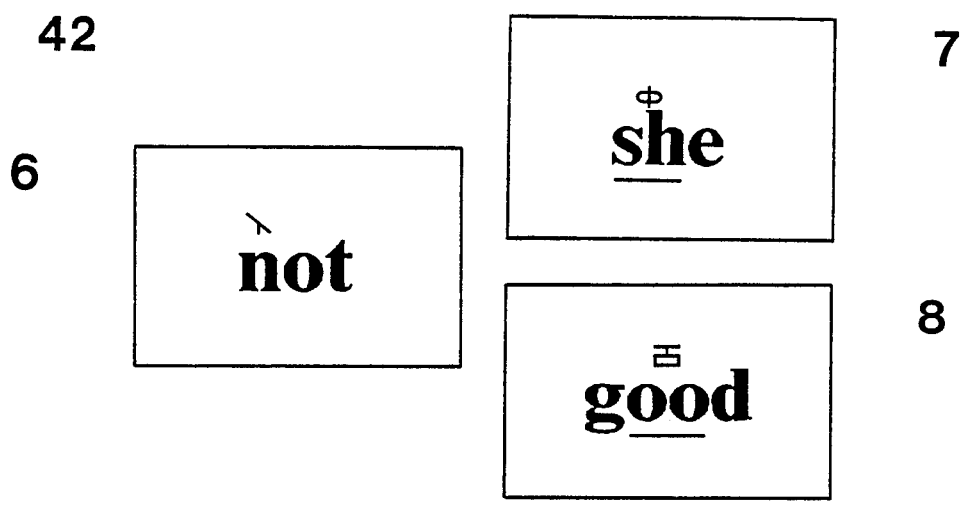
FIG. 42 shows several flashcards used to develop various skills in reading.

FIG. 42 shows three flashcards with one sound in each word labeled. In this application, of using the symbols to indicate the sound that a letter represents within a word, the symbols are used much as diacritical marks would be. Material in a form similar to 6 is appropriate for use with a student who is acquiring an initial reading vocabulary. This allows the student to form a first connection between the oral and written forms of a word by using only the first sound of that word. 7 shows a word with a consonant diagraph labeled. 8 shows a word with the vowel sound labeled. As different specific skills are taught in the course of reading instruction, words are presented to the class in these different forms to emphasize and explain the part of the word being addressed.

Figure 43:
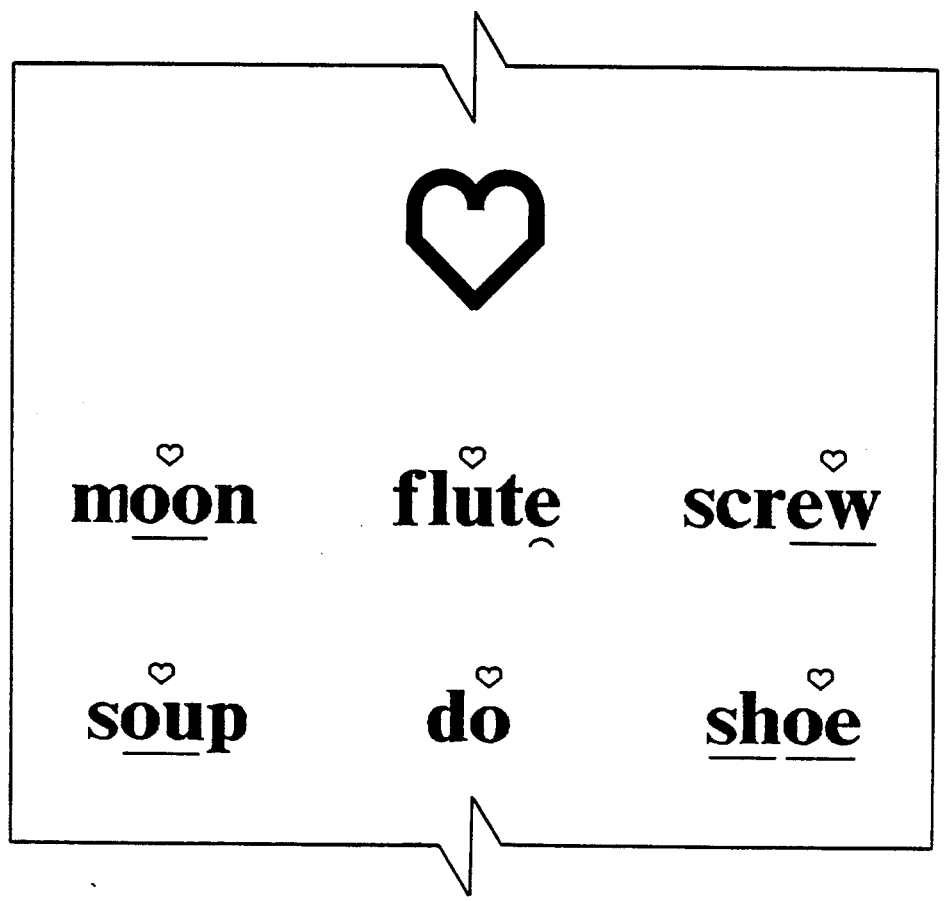

FIG. 43 shows a portion of a chart that can be used in spelling instruction. Several graphic representations of a single language sound are indicated. The use of an independent sound symbols allows the various ways of representing a sound, in this case "oo," "u-e," "ew," "ou," "o," and "oe," to be grouped without confusion. In the absence of such a symbol, the student can only associated these spellings with another spelling, in this case probably "oo," and the distinction between sound and the representation of sound is confused.

Obviously, the thirty-nine symbols and events that appear in the illustrated embodiment are not the only ones that can be used to represent these sounds, nor are these sounds the only ones that are capable of being represented in this way. Neither is it only with the English language that the invention can be used productively. Instruction in the oral and written forms of a language foreign to the student can also be enhanced through the use of the invention disclosed herein. The present invention may be carried out in other specific ways than those herein set forth without departing from the spirit and essential characteristics of the invention. The present embodiments are, therefore, to be considered as illustrative and not restrictive.

We claim:

1. A method of teaching, comprising:
   presenting a discrete language sound to a student,
   presenting a depiction of a soniferous event to said student,
      said soniferous event consisting of an event distinct from articulation of said language sound, and comprising
         an environmental sound comprising a character similar to that of said language sound,
   presenting an indicium to said student,
   whereby said student can be taught to associate said indicium with said language sound without using a skill comprising a knowledge of phonemic segmentation.

2. A method of teaching as in claim 1, wherein said indicium comprises:
   a graphic representation of essential components of said soniferous event,
   whereby said student is given a meaningful connection between said indicium and said language sound.

3. A method of teaching as in claim 2, wherein said step of presenting a discrete language sound comprises:
   a written description,
   whereby the identity of said language sound may be conveyed to a literate adult.

4. A method of teaching as in claim 2, wherein said indicium consists of:
   a symbol distinct from the Roman alphabet,
   whereby confusion between said language sound and an alphabetic representation of said language sound is avoided.

5. A method of teaching as in claim 4, comprising additional steps of:
   presenting to said student an operation comprising:
      articulating said language sound, and
      executing simultaneously a distinct gesture which comprises a meaningful relationship with said soniferous event,
   causing said student to duplicate said operation,
   whereby said student is given an additional, meaningful connection between said indicium and said language sound.

6. A method of teaching as in claim 5 wherein said depiction comprises:
   a graphic depiction of said soniferous event.

7. A method of teaching as in claim 6 wherein each said graphic depiction comprises:
   said indicium,
   whereby said student may more easily associate said indicium with said soniferous event and hence with said language sound.

8. A method of teaching as in claim 7 comprising additional steps of:
   providing a name for said language sound,
   presenting said name to said student,
   whereby said student is given an additional means of referring to said language sound.

9. A teaching device comprising:
   a means for carrying information,
   a diagram comprising:
      a graphic depiction of a soniferous event, said soniferous event comprising:
         a sound comprising a character similar to that of a discrete language sound, and
         an event distinct from articulation of said language sound,
      an indicium consisting of a symbol distinct from the Roman alphabet, and comprising a graphic representation of essential components of said soniferous event,
   said diagram applied to said means for carrying information,
   whereby an aid is provided to teach a student to make a meaningful connection between said indicium and said language sound without using a skill comprising a knowledge of phonemic segmentation.

10. The teaching device of claim 9 wherein said indicium consists of:
    a graphically simple form,
    whereby said indicium remains individually identifiable by an unaided human eye at a viewing distance of 2.0 feet when said indicium is displayed with a maximum dimension of 0.2 inch.

11. The teaching aid of claim 10 wherein said diagram also comprises:
    presentation of said indicium in a manner that said indicium may be unambiguously identified within said diagram.

12. A teaching device, comprising:
    means to present a discrete language sound,
    means to present a depiction of a soniferous event, said soniferous event consisting of an event distinct from articulation of said language sound, and comprising an environmental sound comprising a character similar to that of said language sound, means to present an indicium, whereby a device is provided to teach a student to associate said indicium with said language sound without using a skill comprising a knowledge of phonemic segmentation.

13. The teaching device of claim 12, wherein said indicium comprises a graphic representation of essential components of said soniferous event, whereby said devices can teach a meaningful association of said indicium with said language sound.

14. The teaching device of claim 13, wherein said depiction comprises:

a graphic depiction of said soniferous event comprising said indicium.

* * * * *